United States Patent [19]

Wood

[11] 3,914,277

[45] Oct. 21, 1975

[54] HYDROCARBON RECOVERY PROCESS

[75] Inventor: William Laurence Wood, Farnham, England

[73] Assignee: Davy Powergas Limited, Teeside, England

[22] Filed: Mar. 16, 1972

[21] Appl. No.: 235,305

[30] Foreign Application Priority Data

Mar. 19, 1971 United Kingdom............... 7287/71

[52] U.S. Cl. .................... 260/465.3; 55/44; 55/47; 55/51; 55/56; 260/465.9; 260/533 N; 260/604 R

[51] Int. Cl.² ............... C07C 120/14; C07C 121/32

[58] Field of Search ....... 260/465.3, 666 SA; 55/47, 55/51, 44, 56

[56] References Cited

UNITED STATES PATENTS

| | | | |
|---|---|---|---|
| 3,594,987 | 7/1971 | Oda et al. | 260/456 C |
| 3,686,267 | 8/1972 | Taylor | 260/465.3 |

*Primary Examiner*—Joseph P. Brust
*Attorney, Agent, or Firm*—Morton, Bernard, Brown, Roberts & Sutherland

[57] ABSTRACT

Unconverted hydrocarbon, for example propane, in a gaseous mixture from a hydrocarbon oxidation reaction is absorbed in a liquid absorbent and recovered by stripping the absorbent with nitrogen or a mixture of nitrogen and oxygen. The recovered hydrocarbon in admixture with the stripping gas is then recycled to the reaction.

17 Claims, 1 Drawing Figure

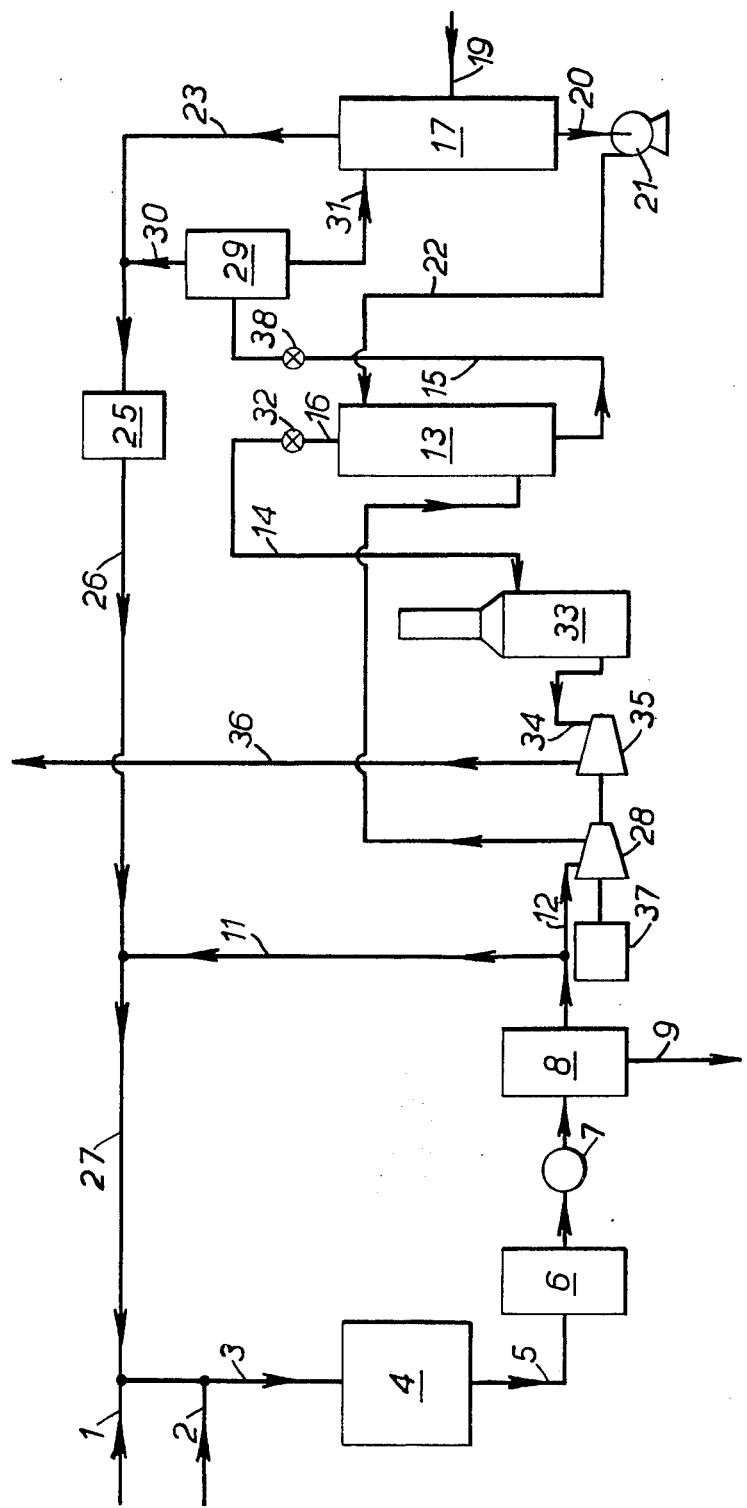

HYDROCARBON RECOVERY PROCESS

This invention relates to processes for recovering hydrocarbons from mixtures of gases.

In some oxidation (including ammoxidation) reactions in which an alkane is involved, such as those described in the specifications of British cognated copending applications Nos. 53267/70 and 14074/70; 53266/70, 14072/70, 34508/70, 35500/70 and 50131/70; 57587/69 and 14071/70; and 7681/71 and 58745/71, it is found that an improved reaction efficiency can be obtained by operating with a high concentration of the alkane and a low concentration of oxygen (and in the case of ammoxidation, ammonia). This leads to the conversion in the reactor of only a small proportion of the hydrocarbon supplied to the reactor and gives a product gas which will have a hydrocarbon content several times that of the desired product. After removal of the desired product all of the unconverted hydrocarbon could be recycled to extinction, except that it is usually contaminated with by-products formed during the reaction, such as carbon dioxide, and/or by unreacting material introduced with the feedstock, such as nitrogen.

It is necessary to remove these contaminants from the cycle at the rate at which they are produced or introduced to prevent their concentration building up and displacing the reactants and thus stopping the reaction. The contaminants, which contain permanent gases, are difficult to remove from the hydrocarbon by any economic means and it is preferable to recover the hydrocarbon from the gas stream after removing the desired product and to return the recovered hydrocarbon to the reactor. It is not necessary to treat the whole of the product stream in this manner, but to carry out hydrocarbon recovery on a purge stream only.

The contaminant concentration in the purge stream will depend on the purge rate, among other things. This rate is determined from an economic balance between the marginal cost of equipment and utilities incurred in recycling contaminants around the system and the cost of recovery of hydrocarbon from the purge stream, such latter cost depending on the purge gas volume.

An object of the present invention is to provide an improved method of recovering the hydrocarbon from the purge stream.

It is known that light hydrocarbons, i.e. principally $C_2$ to $C_5$ hydrocarbons, can be removed from a stream of which the other constituents are permanent gases, e.g. natural gas, i.e. methane, by absorbing the light hydrocarbons in an absorption column in which the gaseous mixture passes in counter-current flow to a wash oil. The oil has a vapour pressure relatively low compared with the hydrocarbons to be removed, but has a highly selective power of absorption for the latter compared with the permanent gases.

The conventional method of recovering these light hydrocarbons from the wash oil has been to pass the enriched oil down a heated stripping column, using steam or wash oil vapour as the stripping medium. This involves heating the oil to a temperature above which steam will not condense or to a temperature at which the oil will boil, whichever is the lower, at the pressure at which the stripping column is operated.

We have now found that means for the provision of this heat, and its cost, may be avoided by using nitrogen or a mixture of nitrogen and oxygen as a stripping medium, preferably in an adiabatic system, and passing such stripping gas, in admixture with the recovered hydrocarbon, to the reactor feed stream.

Thus, according to the invention in a process for the recovery of a hydrocarbon from gas from a hydrocarbon oxidation (including ammoxidation) reaction in which the hydrocarbon is incompletely converted in the reaction and in which the unconverted hydrocarbon is recycled to the reaction, the hydrocarbon in the gas is separated by absorbing the hydrocarbon in a liquid absorbent and is recovered therefrom by stripping the liquid absorbent with nitrogen or a mixture of oxygen and nitrogen, the nitrogen or said mixture being returned, in admixture with the recovered hydrocarbon, to the reactor.

When a mixture of nitrogen and oxygen is used for stripping it preferably contains at least 30 percent and more preferably at least 50 percent nitrogen by volume. It is most convenient to use air for the stripping.

The hydrocarbon can be an alkane or alkene as described in the specifications of the said copending applications. In particular the alkane or alkene preferably has 3 to 8 carbon atoms and is acyclic. Most preferably it is propane or isobutane. Thus the oxidation reaction may be an ammoxidation of an alkane or alkene to produce the corresponding unsaturated nitrile. With propane or isobutane the nitrile is acrylonitrile or methacrylonitrile respectively. The partial pressure of the alkane or alkene in an oxidation reaction is preferably at least 0.20 atmospheres absolute, more preferably at least 0.35 and most preferably at least 0.70 atmospheres absolute. The reaction is preferably carried out at a feed gas pressure of 1 to 5 atmospheres absolute. The temperature is desirably below 500°C for the efficiency of the oxidation reaction, but the present process can of course be employed regardless of what the reaction temperature may be.

Any liquid may be used as the liquid absorbent, provided that it absorbs the hydrocarbon, whilst absorbing substantially none or only a minor proportion of the gases from which the hydrocarbon is to be separated, and that it can be stripped of the hydrocarbon by the said nitrogen or mixture of nitrogen and oxygen. Suitable liquid absorbents are, inter alia, light oils, paraffinic in nature, having 10 to 17 carbon atoms, e.g. kerosene, heavy naphtha or light gas oil. Hydrocarbon oils, lighter than $C_{10}$ can be used, particularly at low temperatures, but tend to vaporise too easily at normal temperatures. Very heavy oils tend to be too viscous and give low tray efficiencies in columns in which the stripping and absorption are preferably carried out. Among other suitable liquids are acetone and isopropyl alcohol although it is necessary in the case of these absorbents to water wash them out of overhead gases from the absorption and stripping columns if absorbent is not to be lost and if absorbent is not to be fed to the reactor with the recovered hydrocarbon.

It will usually be found preferable to operate the stripping column at a pressure exceeding the pressure in the reactor by only a small amount, e.g. by 0.10 to 20 psi and preferably less than 5 psi. The pressure chosen for the absorption column depends on the efficiency of the conversion reaction, the volume of gas used in the stripping column and its nitrogen content, and the concentration of the hydrocarbon in the reactor.

When air is used as the stripping gas, it will be found necessary to compress the stream from which hydrocarbon is to be recovered so as to operate the absorption column at a pressure substantially higher (typically 3 to 4 times higher) than that of the stripping column. The ratio of absorption column/stripping column pressure varies with each reaction and with any alteration in reaction conditions. In general it is in the range 2:1 to 7:1 and preferably 2.5:1 to 4:1.

The invention will be more readily understood from the following example of a method of recovering propane from a mixture of gases resulting from an ammoxidation reaction, reference being made to the accompanying drawing, the FIGURE, which shows a process in which the propane is absorbed in kerosene and air is used for stripping the absorbed propane.

The propane ammoxidation is operated, as a recycle process, with a feed gas of propane, ammonia and air at low conversions of propane per pass through a reactor (referred to below), but relatively high conversions of oxygen and ammonia. By "conversion" is meant the difference in the amounts of the substance in question in the feed gas and exit gas divided by the amount of the substance in the feed gas. Typically the process is operated at 400° to 450°C and at 2 to 4 atmospheres absolute with a propane partial pressure of 0.7 to 1.6 atm. Conversions of propane, oxygen and ammonia are, for example, 10 percent, 90 percent and 90 percent respectively.

Propane make-up and ammonia are fed through lines 1 and 2 respectively, meeting a recycled air/propane mixture in line 27, to pass into a reactor 4 in this case at 55 psia. Exit gases from the reactor are subjected to excess ammonia removal in a tower 6 before entering a recycle compressor 7 and passing to a nitrile recovery system 8. The unconverted propane leaves this system, accompanied by oxides of carbon and nitrogen. Because air is used, the nitrogen will represent a substantial proportion (approximately 50 percent) of the stream. If the conversion of propane is less than 10 percent, the stream is split into two portions, one in line 11 and the other in line 12, that in line 12 representing the purge stream passing to the propane recovery system and that in line 11 by-passing this system. With a conversion of propane of 3 percent the volumetric ratio of gas passing through the line 11 to that in the line 12 is 2.4:1.

The gaseous mixture in line 12 is fed to a compressor 28 to raise the pressure of the mixture to 160 to 180 psia before being passed to an absorption column 13. This pressure is high enough to ensure substantially complete removal of the propane in the absorption column 13 from the associated oxides of carbon and nitrogen when using the maximum flow of kerosene which can be stripped of propane by the air.

At sufficiently high conversions of propane, i.e. in general at least 10 percent conversion, it is preferable not to split the gas stream from the recovery systems, but to feed the entire stream to the column 13 (i.e. the line 11 is eliminated). In this latter case the compressors 7 and 28 are replaced by a single machine.

The pressure in the absorption column 13 is high enough to dispense with a pump for transferring the propane-rich absorption liquid to the top of a stripping column 17 and it simply flows by line 15, fia a pressure reduction valve 38, to a liquid/gas separator 29 from the head of which any gaseous propane which has been liberated from the absorption liquid by pressure reduction leaves by line 30, leaving the remaining dissolved propane to pass by line 31 to the top of the stripping column 17. Alternatively, the column 17 and the separator 29 can be combined in a single tower. The stripping column is operated at a pressure of 58 psia. The liquid passes down this column being met by an upward flow of air introduced through line 19 to the base of the column. It is normally found advantageous to use all of the air required for stripping in this column to minimise the pressure required in the absorption column. The flow rate of the kerosene in the absorption and stripping columns and the above mentioned pressure in the absorption column are chosen so that the columns can be designed with a reasonable number of trays. The flow rate of purge gas to the absorption column is 4619 kg. mols per hour, the gas containing 40.3 percent propane. The lean kerosene flow rate is 4070 kg. mols per hour. Lastly, the flow rate of air to the stripping column is 3173 kg. mols per hour.

The kerosene, stripped of its propane, is passed back to the head of the absorption column 13 by line 20, pump 21 and line 22 whilst the recovered propane passes by line 23 from the head of the stripping column in admixture with the air supplied at the base of the column. This mixture then meets the propane from line 30, which had been liberated from the propane-rich kerosene on pressure reduction and passes to a vapour removal unit 25 for removal of kerosene vapour by lowering the temperature with resultant condensation or absorption on a solid. From the unit 25 it leave by line 26 to meet the by-pass stream in line 11 and passes by line 27 back to the reactor 4.

The gas which leaves the top of the absorption column 13 by line 14 and from which the propane has been almost completely removed, passes through a back-pressure control valve 32 and then through a heater or tail gas oxidation unit 33 before entering an expansion turbine 35, via line 34. The turbine 35 is coupled to the shaft of the compressor 28. The purge gases finally pass to waste at atmospheric pressure through line 36. It is found that a substantial portion of the power required by the compressor 28 can be provided by the expansion turbine 35 and the remainder can be provided by any suitable prime mover 37, also coupled to the compressor shaft.

I claim:

1. In a process for the ammoxidation of propane or isobutane in which the effluent from the reaction contains unreacted propane or isobutane, carbon oxides, nitrogen, and acrylonitrile or methacrylonitrile as desired product, in which said desired product is removed from the reaction effluent, and in which unreacted propane or isobutane is separated from carbon oxides and nitrogen in the reaction effluent and recycled to the reaction, the improvement which comprises contacting said reaction effluent from which said desired product has been removed with liquid absorbent to absorb unreacted propane or isobutane and none or only a minor portion of said carbon oxides and nitrogen, contacting resulting liquid absorbent containing propane or isobutane with nitrogen or a mixture of oxygen and nitrogen as a stripping gas to strip propane or isobutane from said liquid absorbent and obatain a gaseous effluent containing propane or isobutane and stripping gas, and passing said gaseous effluent to said reaction.

2. A process according to claim 1 in which the stripping gas is a mixture of nitrogen and oxygen containing at least 30 percent nitrogen by volume.

3. A process according to claim 2 in which the stripping gas is a mixture of nitrogen and oxygen containing at least 50 percent nitrogen by volume.

4. A process according to claim 3 in which the stripping gas is air.

5. A process according to claim 2 in which the absorbent liquid is a paraffinic oil containing 10 to 17 carbon atoms.

6. A process according to claim 5 in which the liquid absorbent is an oil selected from the group kerosene, heavy naphtha, and light gas oil.

7. A process according to claim 2 in which all of the gas from which desired product is removed is treated for said absorption and recovery of propane or isobutane.

8. A process according to claim 2 in which only a portion of the gas from which desired product is removed is treated for said absorption and recovery of propane or isobutane.

9. A process according to claim 2 in which the partial pressure of the propane or isobutane in the ammoxidation reaction is at least 0.20 atmosphere absolute.

10. A process according to claim 9 in which the said partial pressure is at least 0.35 atmosphere absolute.

11. A process according to claim 10 in which the said partial pressure is at least 0.70 atmosphere absolute.

12. A process according to claim 10 in which the acyclic hydrocarbon is propane.

13. A process according to claim 10 in which the reaction is carried out at a pressure of 1 to 5 atmospheres absolute.

14. A process according to claim 2 in which the stripping is carried out in a stripping column operated under a pressure of 0.10 to 20 psi above the pressure of the reaction.

15. A process according to claim 14 in which the stripping column is operated under a pressure of less than 5 psi above the pressure of the reaction.

16. A process according to claim 2 in which the absorption is carried out in an absorption column which is operated at a pressure which is three to four times higher than the pressure of the reaction.

17. A process according to claim 14 in which the ratio of absorption column pressure to stripping column pressure is 2.5:1 to 4:1.

* * * * *